(12) United States Patent
Kuribayashi

(10) Patent No.: US 10,855,874 B2
(45) Date of Patent: *Dec. 1, 2020

(54) OPTICAL SCANNING DEVICE AND IMAGE FORMING APPARATUS

(71) Applicant: TOSHIBA TEC KABUSHIKI KAISHA, Tokyo (JP)

(72) Inventor: Yasushi Kuribayashi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 1 day.

This patent is subject to a terminal disclaimer.

(21) Appl. No.: 16/531,868

(22) Filed: Aug. 5, 2019

(65) Prior Publication Data

US 2019/0356811 A1 Nov. 21, 2019

Related U.S. Application Data

(63) Continuation of application No. 16/000,345, filed on Jun. 5, 2018, now Pat. No. 10,425,551.

(30) Foreign Application Priority Data

Dec. 14, 2017 (JP) .................................. 2017-239660

(51) Int. Cl.
*G03G 15/00* (2006.01)
*H04N 1/12* (2006.01)
(Continued)

(52) U.S. Cl.
CPC .......... *H04N 1/1275* (2013.01); *G02B 26/10* (2013.01); *G02B 26/123* (2013.01); *H04N 1/113* (2013.01)

(58) Field of Classification Search
None
See application file for complete search history.

(56) References Cited

U.S. PATENT DOCUMENTS 4,561,717 A 12/1985 Kataoka et al.
6,198,562 B1 3/2001 Hayashi et al.
(Continued)

FOREIGN PATENT DOCUMENTS

EP    0 661 573 A1    7/1995
JP    H09-179047 A    7/1997
JP    2008-122706 A   5/2008

OTHER PUBLICATIONS

U.S. Appl. No. 15/455,445, filed Mar. 10, 2017, Toshiba TEC Kabushiki Kaisha.
(Continued)

*Primary Examiner* — Cheukfan Lee
(74) *Attorney, Agent, or Firm* — Foley & Lardner LLP

(57) ABSTRACT

An optical scanning device includes plural sets of optical paths, and in each set of optical paths, first and second light beams emitted from the two light sources having an opening angle in the main scanning direction are orthogonal to a deflection axis of a deflector and are deflected and scanned by the same surface of the deflector at different positions deviating from each other in a deflection axis direction. A first imaging optical element gives positive optical power to the deflected light beams to converge the light beams. A focal position exists between the first imaging optical element and a second imaging optical element arranged on the optical paths in front of first and second surfaces to be scanned on two photoconductive drums. A separation distance exists between the light beams.

15 Claims, 7 Drawing Sheets

(51) Int. Cl.
   *G02B 26/12* (2006.01)
   *G02B 26/10* (2006.01)
   *H04N 1/113* (2006.01)

(56) References Cited

U.S. PATENT DOCUMENTS

| | | | |
|---|---|---|---|
| 6,839,157 B2 | 1/2005 | Ono et al. | |
| 7,126,737 B2 | 10/2006 | Atsuumi et al. | |
| 7,184,185 B2 | 2/2007 | Tamaru et al. | |
| 7,236,281 B2 | 6/2007 | Hayashi et al. | |
| 7,538,925 B2 | 5/2009 | Miyatake | |
| 7,800,641 B2 | 9/2010 | Kubo et al. | |
| 7,898,709 B2 | 3/2011 | Masuda et al. | |
| 8,077,368 B2 | 12/2011 | Miyatake | |
| 8,416,271 B2 | 4/2013 | Tomioka | |
| 8,654,172 B2 | 2/2014 | Miyatake et al. | |
| 8,848,009 B2 | 9/2014 | Watanabe et al. | |
| 8,922,863 B2 | 12/2014 | Tokita et al. | |
| 9,323,171 B2 | 4/2016 | Itami et al. | |
| 9,703,097 B2 | 7/2017 | Yuasa | |
| 10,073,372 B1 | 9/2018 | Kuribayashi | |
| 2004/0169905 A1 | 9/2004 | Hayashi et al. | |
| 2005/0168563 A1 | 8/2005 | Shiraishi | |
| 2006/0209377 A1 | 9/2006 | Atsuumi et al. | |
| 2007/0064291 A1 | 3/2007 | Kashimura | |
| 2007/0215800 A1* | 9/2007 | Miyatake | B41J 2/473 250/234 |
| 2007/0236557 A1 | 10/2007 | Imai et al. | |
| 2008/0030565 A1* | 2/2008 | Shimomura | G02B 26/125 347/118 |
| 2008/0130078 A1 | 6/2008 | Okuwaki et al. | |
| 2008/0174843 A1 | 7/2008 | Masuda et al. | |
| 2009/0066780 A1 | 3/2009 | Bannai et al. | |
| 2009/0092417 A1 | 4/2009 | Shimomura | |
| 2009/0231659 A1 | 9/2009 | Masuda et al. | |
| 2009/0323147 A1 | 12/2009 | Amada et al. | |
| 2010/0046055 A1 | 2/2010 | Tomioka | |
| 2010/0119258 A1 | 5/2010 | Teramura | |
| 2010/0182669 A1 | 7/2010 | Igarashi | |
| 2013/0076851 A1 | 3/2013 | Watanabe et al. | |
| 2013/0083148 A1 | 4/2013 | Miyatake et al. | |
| 2013/0147895 A1 | 6/2013 | Miyatake | |
| 2014/0233081 A1 | 8/2014 | Sugiyama | |
| 2017/0003501 A1 | 1/2017 | Yuasa | |
| 2018/0234573 A1* | 8/2018 | Okada | H04N 1/02895 |
| 2018/0259873 A1 | 9/2018 | Kuribayashi | |
| 2019/0079430 A1 | 3/2019 | Kuribayashi | |

OTHER PUBLICATIONS

U.S. Appl. No. 15/702,953, filed Sep. 13, 2017, Toshiba TEC Kabushiki Kaisha.
Notice of Allowance on U.S. Appl. No. 16/000,345 dated Apr. 25, 2019.
Search Report dated Apr. 23, 2019 in corresponding European application No. 18 21 1268.0, 8 pages.

* cited by examiner

OPTICAL SCANNING DEVICE AND IMAGE FORMING APPARATUS

CROSS-REFERENCE TO RELATED APPLICATIONS

This application is a continuation of, and claims the benefit of priority to, U.S. patent application Ser. No. 16/000,345 filed on Jun. 5, 2018 now U.S. Pat. No. 10,425,551, patented Sep. 24, 2019, which in turn claims the benefit of and priority to Japanese Patent Application No. 2017-239660, filed Dec. 14, 2017, the entire contents of all of which are incorporated herein by reference.

FIELD

Some embodiments described herein relate generally to an optical scanning device for scanning with light from a light source and an image forming apparatus provided with the same.

BACKGROUND

Conventionally, for example, a 4-tandem type color copying machine in which four photoconductive drums are horizontally arranged side by side is known as an image forming apparatus. In such a type of the color copying machine, for example, one polygon mirror is arranged between the second photoconductive drum and the third photoconductive drum.

Such a color copying machine has four light sources used for forming electrostatic latent images on surfaces of respective photoconductive drums. For example, the four light sources are divided into two groups on the left side and the right side with the polygon mirror as the center, each group including two light sources. Each light source emits a laser beam based on an image signal of one color subjected to a color separation process. In order to guide the laser beam from the polygon mirror to each photoconductive drum, a plurality of mirrors functioning as scanning optical systems is arranged.

The laser beams emitted from the two light sources on the left side are reflected by the same reflecting surface of the polygon mirror. The reflected laser beams are scanned in a main scanning direction by the rotation of the polygon mirror and then are guided to the two photoconductive drums on the left side through the scanning optical system. Similarly, the laser beams emitted from the two light sources on the right side are reflected by the same reflecting surface of the polygon mirror.

The reflected laser beams are scanned in the main scanning direction by the rotation of the polygon mirror and then are guided to the other two photoconductive drums on the right side through the scanning optical system. These two laser beams, for example, are incident on the polygon mirror with an opening angle in the main scanning direction. Since the emitted light beam is incident on the polygon mirror directly along the sub-scanning direction, the light source is hardly affected by a change in an optical path due to unevenness of the surface.

DETAILED DESCRIPTION

In accordance with at least one embodiment, an optical scanning device comprises a first light source and a second light source; a deflector configured to deflect a first light beam and a second light beam respectively emitted from the first light source and the second light source with a same surface of the deflector; a first imaging optical element configured to give predetermined properties to the first light beam and the second light beam deflected by the deflector; a second imaging optical element configured to guide the first light beam emitted from the first imaging optical element onto a first surface to be scanned; and a third imaging optical element configured to guide the second light beam emitted from the first imaging optical element onto a second surface to be scanned, wherein the first light beam and the second light beam emitted from the first light source and the second light source have an opening angle in a main scanning direction between principal rays of the first light beam and the second light beam, and are incident on the same surface of the deflector at different positions deviating from each other in a deflecting axis direction while orthogonal to the deflecting axis of the deflector, the deflector is configured such that the principal rays of the deflected first light beam and the deflected second light beam are incident on the first imaging optical element while separated from an optical axis of the first imaging optical element at a predetermined distance, and the first imaging optical element gives positive optical power in a sub-scanning direction to the incident first light beam and second light beam over an entire main scanning direction, and a focal position exists between the first imaging optical element and the second imaging optical element together with the third imaging optical element.

Hereinafter, embodiments will be described in detail with reference to the accompanying drawings.

Figure 1:
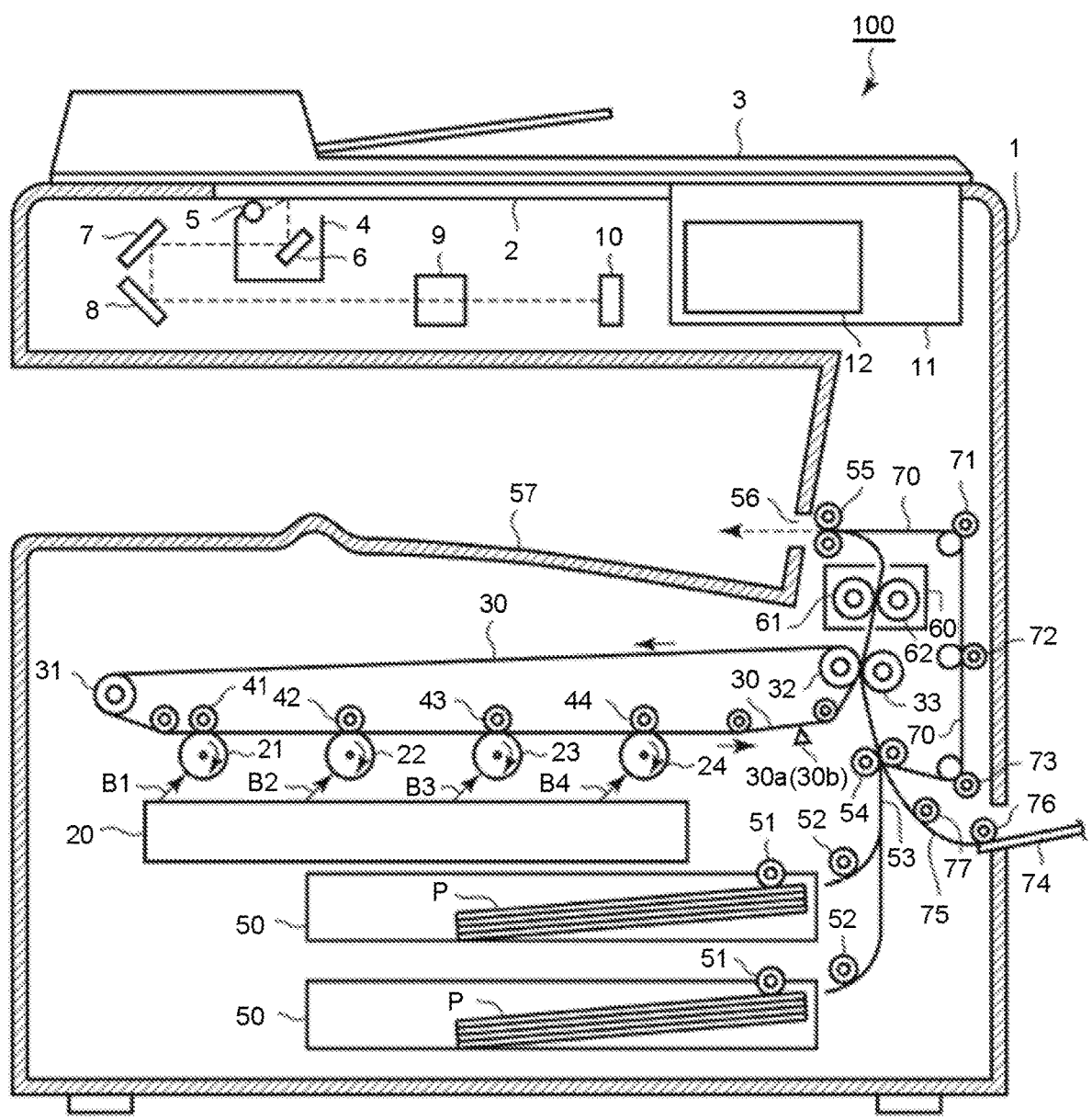
FIG. 1 is a schematic diagram illustrating an image forming apparatus according to at least one embodiment.

As shown in FIG. 1, a color copying machine 100 which is an example of an image forming apparatus has a transparent document table (glass plate) 2 for placing a document at the upper part of a main body 1. The document table 2 has a one-side cover 3 so as to cover the upper surface of the document table 2. A carriage 4 is arranged in the main body 1 at the lower surface side of the document table 2. The carriage 4 houses an exposure lamp 5 and a mirror 6 therein. In the vicinity of the carriage 4, mirrors 7 and 8, a variable power lens block 9, and a CCD (Charge Coupled Device) 10 are arranged. The carriage 4 reciprocates along the lower surface of the document table 2. The exposure lamp 5 exposes a document placed on the document table 2 as the carriage 4 reciprocates. A reflected light image generated by the exposure passes through the mirrors 6, 7 and 8, and the variable power lens block 9, and is received by the CCD 10. The CCD 10 outputs an image signal of a level corresponding to the reflected light image from the document. In the vicinity of the document table 2, a control panel 11 for setting operation conditions is arranged. The control panel 11 has a touch panel type liquid crystal display 12.

An image signal output by the CCD 10 is received by an exposure unit 20 (optical scanning device). The exposure unit 20 performs a color separation process on the image signal received from the CCD 10 to obtain each color component, for example, yellow, magenta, cyan and black. Four light sources L1, L2, L3, and L4 described later emit laser beams corresponding to image signals of respective colors. Hereinafter, the laser beam corresponding to the yellow image signal is referred to as laser beam B1, the laser beam corresponding to the magenta image signal is referred to as laser beam B2, the laser beam corresponding to the cyan image signal is referred to as laser beam B3, and the laser beam corresponding to the black image signal is referred to as laser beam B4. The laser beam B1 is emitted towards a photoconductive drum 21 which is an image carrier for yellow. Likewise, the laser beam B2 is emitted to a photoconductive drum 22 which is an image carrier for magenta, the laser beam B3 is emitted to a photoconductive drum 23 which is an image carrier for cyan, and the laser beam B4 is emitted to a photoconductive drum 24 which is an image carrier for black, respectively.

The photoconductive drums 21, 22, 23, and 24 which are image forming sections are arranged in this order horizontally from the left to the right in FIG. 1 at regular intervals. An intermediate transfer belt 30 is arranged above these photoconductive drums 21, 22, 23 and 24. The intermediate transfer belt 30 is wound around a driving roller 31 and a driven roller 32. The intermediate transfer belt 30 receives a power from the driving roller 31 to rotate counterclockwise.

Primary transfer rollers 41, 42, 43 and 44 are arranged at respective positions facing the photoconductive drums 21, 22, 23 and 24. The primary transfer rollers 41, 42, 43 and 44 can move up and down in an energized state without separating from the intermediate transfer belt 30.

The primary transfer rollers 41, 42, 43 and 44 rotate while pressing the intermediate transfer belt 30 against circumferential surfaces of the photoconductive drums 21, 22, 23 and 24, and thus, images on the photoconductive drums 21, 22, 23 and 24 are transferred onto the intermediate transfer belt 30.

Registration sensors 30a and 30b are arranged at positions opposite to the intermediate transfer belt 30 on the downstream side of the photoconductive drum 24 for black in a separated manner in a width direction of the intermediate transfer belt 30. The registration sensors 30a and 30b respectively detect registration patterns formed on the intermediate transfer belt to detect positional deviation in the images of the respective colors.

Figure 2:
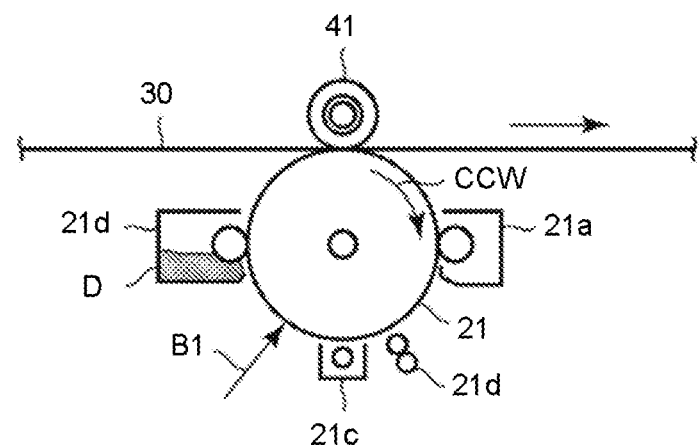
FIG. 2 is a schematic diagram illustrating peripheral components of a photoconductive drum of the image forming apparatus shown in FIG. 1.

Next, with reference to FIG. 2, the configurations of the photoconductive drum 21 and peripheral components thereof are described.

A cleaner 21a, a charge removing lamp 21b, a charging unit 21c, and a developing unit 21d are arranged around the photoconductive drum 21 in a clockwise direction to form a developing module. The cleaner 21a removes a developer left on the surface of the photoconductive drum 21. The charge removing lamp 21b removes the charge left on the surface of the photoconductive drum 21. The charging unit 21c charges the surface of the photoconductive drum 21 with electrostatic charge.

The laser beam B1 emitted from the exposure unit 20 is emitted to the surface of the photoconductive drum 21 charged by the charging unit 21c. The laser beam B1 forms an electrostatic latent image on the surface of the photoconductive drum 21. The developing unit 21d develops the electrostatic latent image on the surface of the photoconductive drum 21 by supplying yellow developer D to the surface of the photoconductive drum 21.

The peripheral components of the other photoconductive drums 22, 23, and 24 have the same configuration as those of the photoconductive drum 21, and thus a detailed description thereof is omitted. The magenta developer D, the cyan developer D, and the black developer D are supplied to the photoconductive drums 22, 23, and 24, respectively.

A plurality of sheet feed cassettes 50 is arranged below the exposure unit 20. These sheet feed cassettes 50 accommodate a large number of sheets P (transfer-receiving media) which are image receiving media of different sizes. A pickup roller 51 and a sheet feed roller 52 are provided at a taking-out port of each of these sheet feed cassettes 50. Each pickup roller 51 contacts with the sheet P in each sheet feed cassette 50 to pick up the sheets P one by one. Each sheet feed roller 52 supplies the sheet P picked up by each pickup roller 51 to a conveyance path 53. The conveyance path 53 extends to an upper sheet discharge port 56 through the registration roller 54, the driven roller 32, the fixing unit 60, and the sheet discharge roller 55. The sheet discharge port 56 faces a sheet discharge tray 57.

A secondary transfer roller 33 is arranged at a position opposite to the driven roller 32 across the intermediate transfer belt 30 and the conveyance path 53. The secondary transfer roller 33 transfers the image formed on the intermediate transfer belt 30 onto the sheet P fed from the registration roller 54. The secondary transfer roller 33 constitutes a transfer module, together with the intermediate transfer belt 30, the driving roller 31, the driven roller 32, and the primary transfer rollers 41, 42, 43 and 44.

From the end of the conveyance path 53 to a position on the upstream side of the registration roller 54, a conveyance path 70 for reversing the front and back surfaces of the sheet P and returning it to the conveyance path 53 is arranged. Sheet feed rollers 71, 72 and 73 are arranged on the conveyance path 70.

A manual feed tray 74 is detachably arranged on the side wall of the main body 1. From the manual feed tray 74 to the position on the upstream side of the registration roller 54 on the conveyance path 53, a conveyance path 75 is arranged. A pickup roller 76 and a sheet feed roller 77 are arranged at positions corresponding to the conveyance path 75. The pickup roller 76 picks up the sheets on the manual feed tray 74 one by one. The sheet feed roller 77 supplies the sheet picked up by the pickup roller 76 to the registration roller 54.

The fixing unit 60 includes a heat roller 61 and a pressure roller 62. The fixing unit 60 fixes the image transferred onto the sheet P on the sheet P by heating the conveyed sheet P with the heat roller 61 at 100° C., for example.

Figure 3:
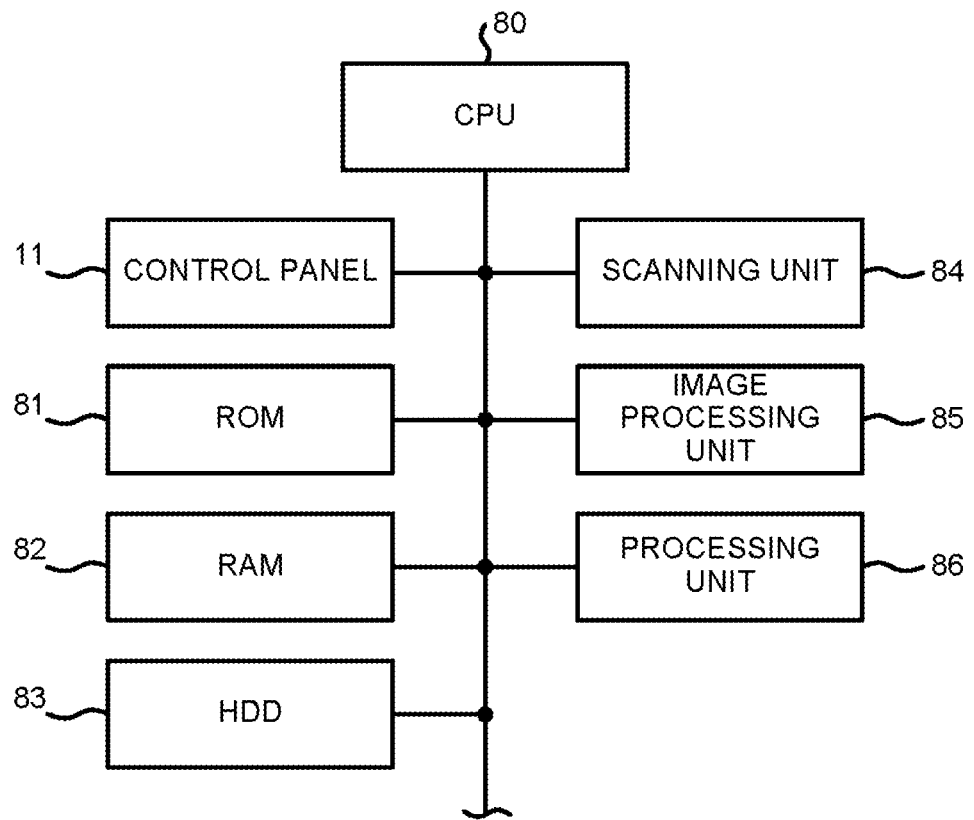
FIG. 3 is a block diagram of a control system of the image forming apparatus shown in FIG. 1.

Next, with reference to FIG. 3, a control circuit of the main body 1 is described.

The control panel 11, a ROM (Read Only Memory) 81, a RAM (Random Access Memory) 82, a HDD (Hard Disk Drive) 83, a scanning unit 84, an image processing unit 85, and a processing unit 86 are connected to a CPU 80 of a computer. The CPU 80 controls the operation of the image forming apparatus of at least one embodiment.

In addition to the touch panel type liquid crystal display 12, the control panel 11 has a numeric keypad, a start key, a copy key for setting an image forming mode, and a scanning key for setting an image reading mode, which are not shown. The ROM 81 stores various control programs. The RAM 82 stores various data. The hard disk drive 83 stores image data.

The scanning unit 84 includes the carriage 4, the exposure lamp 5, the mirrors 6, 7 and 8, the variable power lens block 9, and the CCD 10 as described above, and optically scans an image on a document placed on the document table 2. The image processing unit 85 appropriately processes the image read by the scanning unit 84.

The processing unit 86 includes the exposure unit 20, the photoconductive drums 21, 22, 23 and 24, the components shown in FIG. 2 around the photoconductive drum, the intermediate transfer belt 30, the driving roller 31, the driven roller 32, the primary transfer rollers 41, 42, 43 and 44, the secondary transfer roller 33, the conveyance path 53, the fixing unit 60, the conveyance path 70 and the like, and forms an image processed by the image processing unit 85 on the sheet P.

With reference to FIG. 4 to FIG. 6B, an internal structure of the exposure unit 20 is described.

Figure 4:
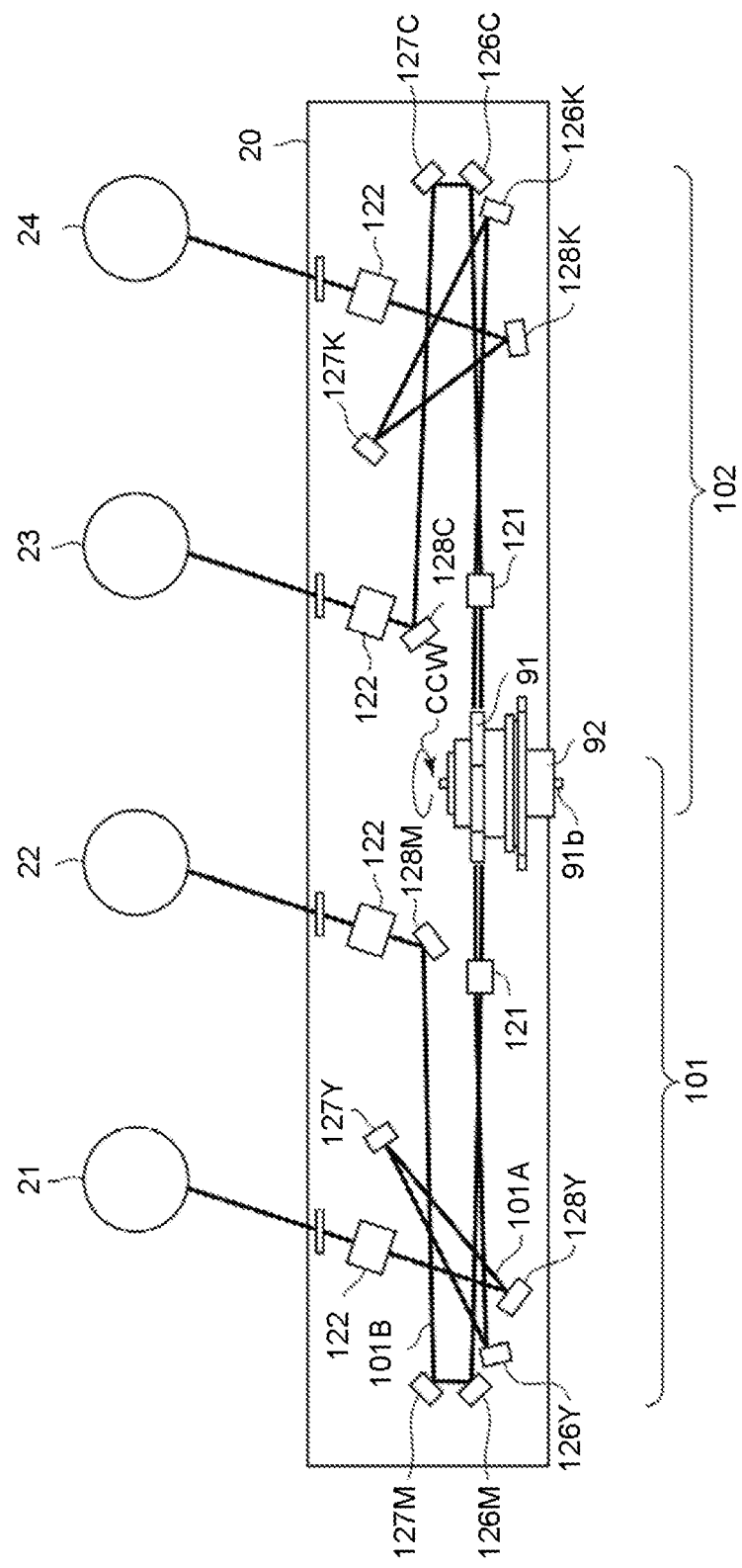
FIG. 4 is a schematic diagram illustrating an internal structure of an exposure unit of the image forming apparatus shown in FIG. 1.
Figure 5:
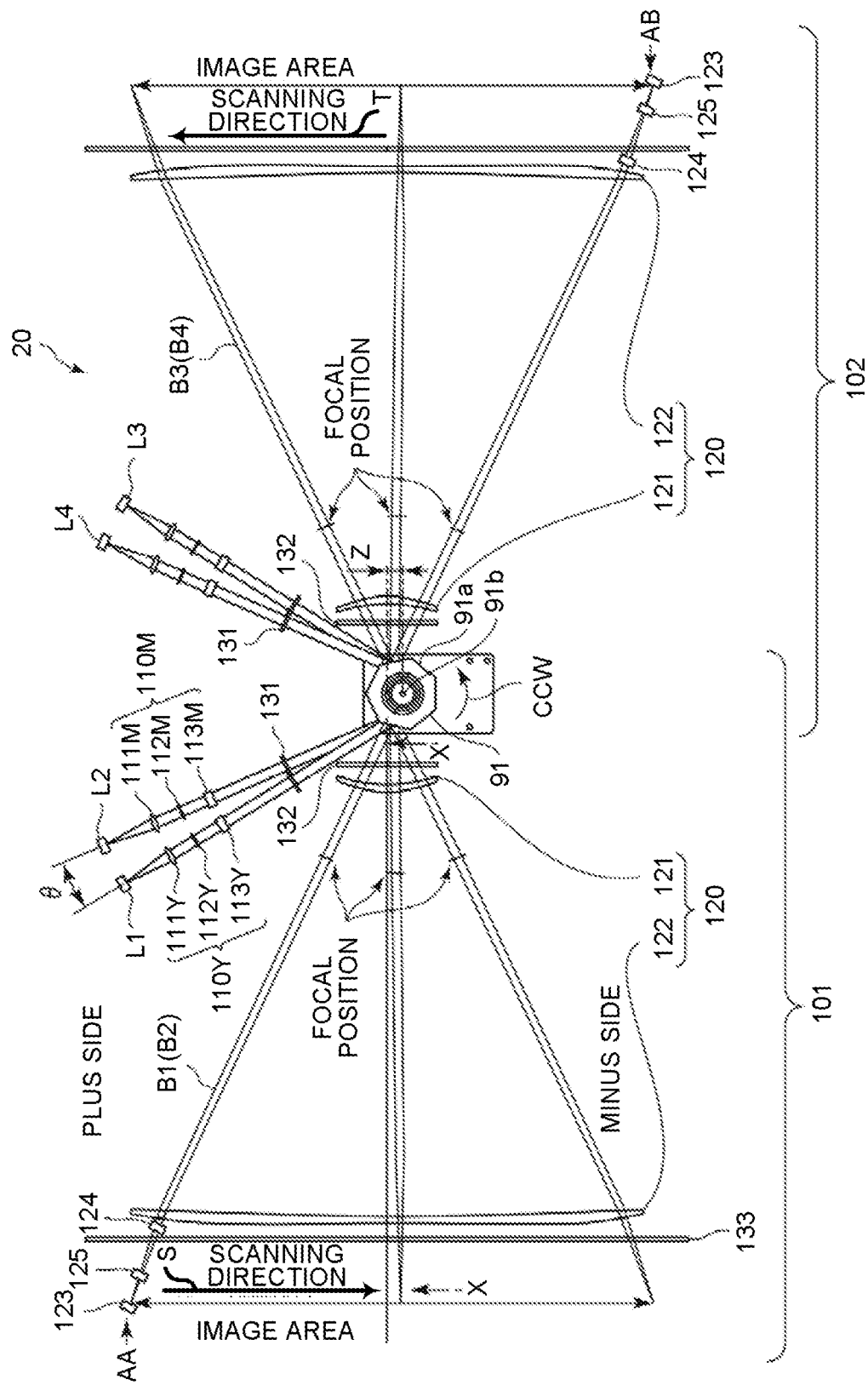
FIG. 5 is a ray diagram in which an optical system of the exposure unit shown in FIG. 4 is developed in a plane.

As shown in FIG. 1 and FIG. 4, the exposure unit 20 is arranged below the four photoconductive drums 21, 22, 23, and 24 and is opposite to the photoconductive drums 21, 22, 23, and 24 at a distance. As shown in FIG. 5, the exposure unit 20 includes a polyhedral mirror main body 91 (hereinafter, referred to as a polygon mirror 91), which is a deflector in which seven planar reflecting surfaces (plane mirrors) are formed into regular polygons, for example. The polygon mirror 91 has a plurality of flat reflecting surfaces 91a (refer to FIG. 5) parallel to a rotation axis thereof. The plurality of the reflecting surfaces 91a is provided on the outer periphery of the polygon mirror 91 continuously along a rotation direction CCW of the polygon mirror 91. The polygon mirror 91 functions as a light deflecting member by reflection.

The exposure unit 20 has a motor 92 for rotating the polygon mirror 91 in the main scanning direction (an arrow direction in FIG. 5) at a predetermined speed. The motor 92 is provided coaxially with the polygon mirror 91. For example, the polygon mirror 91 is integrally attached to a rotation axis of the motor 92.

In at least one embodiment, a plurality of optical elements in the scanning optical system for forming four independent optical paths (light beam path from the light source to the photoconductive drum) for respectively guiding light of four colors is arranged. In this example, the optical paths of the four colors are divided into two sets, each set including two optical paths of two colors, by using the polygon mirror 91 as the center. Specifically, the polygon mirror 91 is arranged between the second photoconductive drum 22 and the third photoconductive drum 23 from the left in FIG. 4 in a posture in which the rotation axis of the polygon mirror 91 is orthogonal to the rotation axes of the photoconductive drums 21, 22, 23, and 24. In other words, the photoconductive drum 21 for yellow and the photoconductive drum 22 for magenta are arranged on the left side of the polygon mirror 91 in FIG. 4, and the photoconductive drum 23 for cyan and the photoconductive drum 24 for black are arranged on the right side of the polygon mirror 91 in FIG. 4.

In the exposure unit 20, two scanning optical systems 101 and 102 are arranged on both sides (left and right sides in FIG. 4) across a single polygon mirror 91. The two scanning optical systems 101 and 102 are symmetrical with respect to a plane parallel to the rotation center of the photoconductive drums 21, 22, 23, and 24 which includes the rotation axis of the polygon mirror 91.

As shown in FIG. 5, the scanning optical system 101 has light sources L1 (first light source) and L2 (second light source) for emitting the laser beam B1 (first light beam) and B2 (second light beam) directing to the two photoconductive drums 21 and 22, respectively. Each of the light sources L1 and L2 is, for example, a laser diode, and the light sources L1 and L2 emit the laser beam B1 corresponding to the image signal for yellow after the color separation process and the laser beam B2 corresponding to the image signal for magenta after the color separation process, respectively.

The scanning optical system 101 performs scanning in the main scanning direction by reflecting the laser beams B1 and B2 emitted from the light sources L1 and L2 with the same reflecting surface 91a of the polygon mirror 91 along a rotation direction CCW (counterclockwise direction) of the polygon mirror 91, and guides the laser beams B1 and B2 towards the two photoconductive drums 21 and 22 shown in FIG. 4, respectively. Similarly, the scanning optical system 102 shown in FIG. 5 has light sources L3 and L4 for emitting laser beams B3 and B4 towards the two photoconductive drums 23 and 24, respectively. The scanning optical system 102 performs scanning in the main scanning direction by reflecting the laser beams B3 and B4 emitted from the light sources L3 and L4 with another same reflecting surface 91a of the polygon mirror 91 along the rotation direction CCW of the polygon mirror 91, and guides the laser beams B3 and B4 towards the two photoconductive drums 23 and 24 shown in FIG. 4, respectively.

The polygon mirror 91 rotates while reflecting the laser beams B1 and B2 emitted by the light sources L1 and L2 with the same reflecting surface 91a (first reflecting surface), to deflect (scan) the laser beams B1 and B2 towards image planes arranged at predetermined positions, i.e., the outer circumferential surfaces of the corresponding photoconductive drums 21 and 22 at a predetermined linear velocity. The photoconductive drums 21 and 22 rotate in the sub-scanning direction, and in this way, electrostatic latent images corresponding to the image signals of the both colors are formed on the outer circumferential surfaces of the photoconductive drums 21 and 22.

Figure 6A:
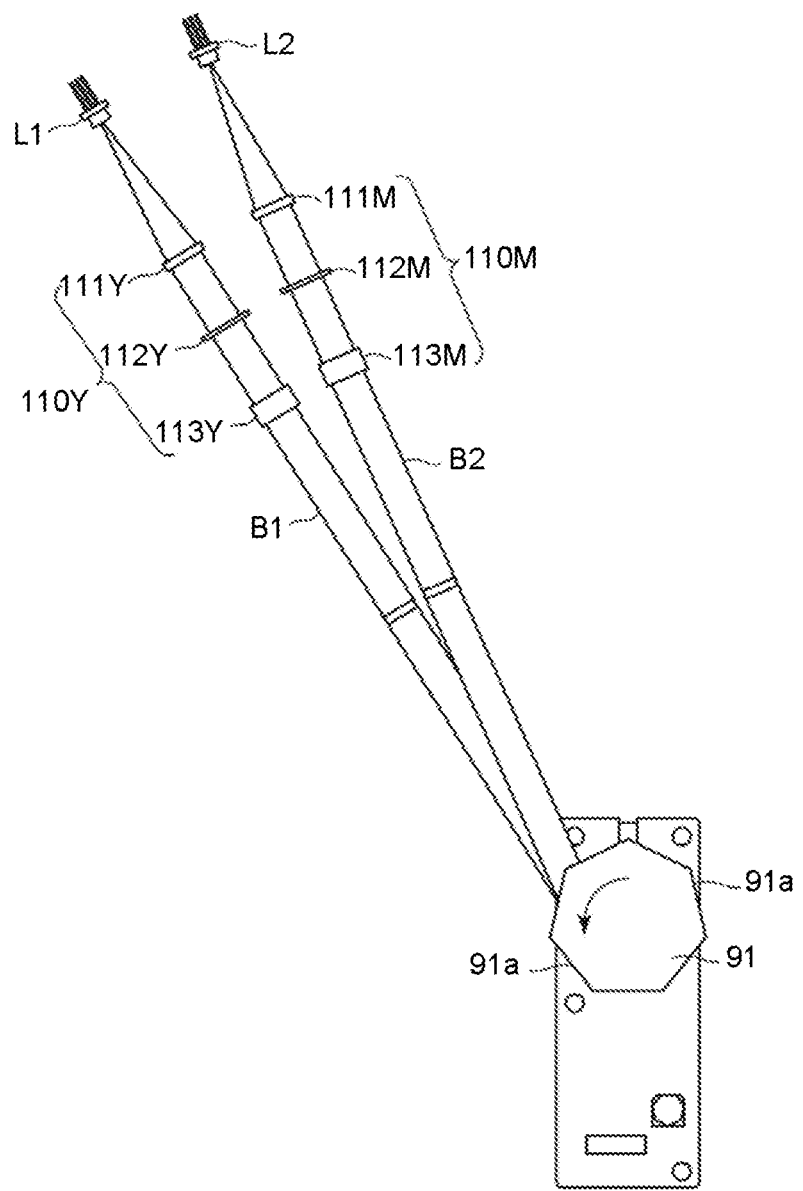
FIG. 6A is a partially enlarged view in which main portions shown in FIG. 5 are partially enlarged.
Figure 6B:
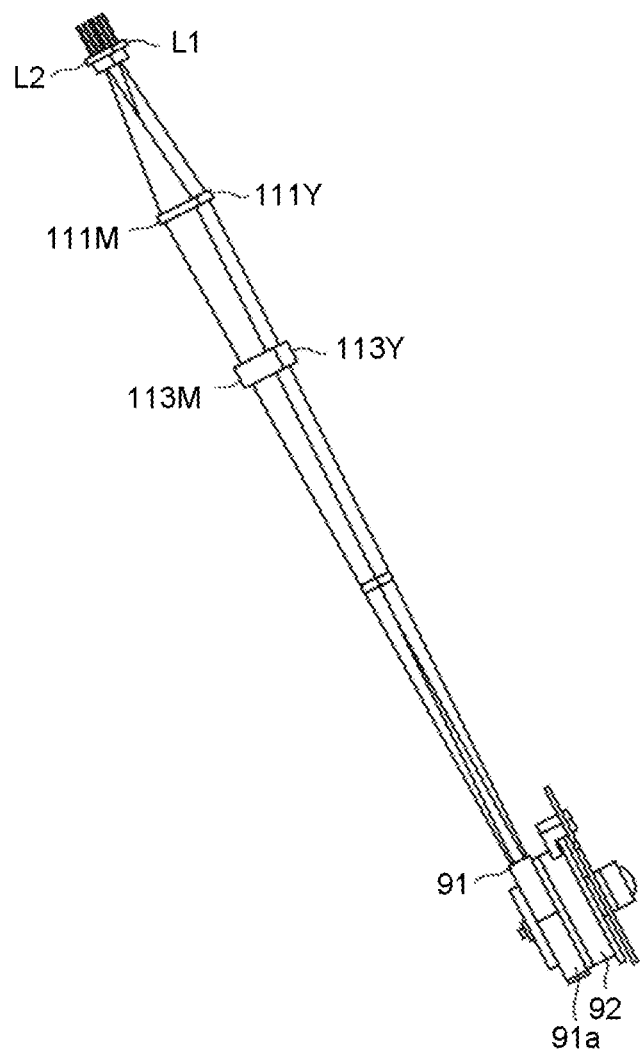
FIG. 6B is a schematic diagram of the structures shown in FIG. 6A as viewed from a side direction.

As shown in FIG. 6A, the two light sources L1 and L2 in the scanning optical system 101 are arranged at different angular positions along the rotation direction CCW (an arrow direction shown in FIG. 6A, i.e., the counterclockwise direction) of the polygon mirror 91 as viewed from above. In other words, the two light sources L1 and L2 have an opening angle θ therebetween in a direction in which the laser beams B1 and B2 are incident when viewed from the polygon mirror 91. Specifically, the light source L1 (yellow) among the two light sources is arranged on the downstream side along the rotation direction CCW of the polygon mirror 91, and the light source L2 (magenta) is arranged on the upstream side along the rotation direction CCW. As shown in FIG. 6B, the two light sources L1 and L2 are slightly shifted in a direction parallel to the rotation axis of the polygon mirror 91. For this reason, the laser beams B1 and B2 respectively emitted from the light sources L1 and L2 are different in arrival positions on the polygon mirror 91 in a direction parallel to the rotation axis of the polygon mirror 91.

Furthermore, pre-deflection optical systems 110Y and 110M are arranged on the optical paths between the light sources L1 and L2 and the polygon mirror 91, respectively.

By making angular positions of the two light sources L1 and L2 with respect to the polygon mirror 91 different from each other, it is possible to arrange independent pre-deflection optical systems 110 without overlapping with each other on both optical paths of the laser beams B1 and B2.

The pre-deflection optical systems 110Y and 110M corresponding to the light sources L1 and L2 include finite focus lenses 111Y and 111M, diaphragms 112Y and 112M, and cylinder lenses 113Y and 113M, respectively. With the finite focus lenses 111Y and 111M, the laser beams B1 and B2 emitted by the light sources L1 and L2 have a predetermined convergence property. With the diaphragms 112Y and 112M, the laser beams B1 and B2 passing through the finite focus lenses 111Y and 111M can have arbitrary sectional beam shapes. With the cylinder lenses 113Y and 113M, the laser beams B1 and B2 passing through the diaphragms 112Y and 112M can further have a predetermined convergence property in the sub-scanning direction.

Furthermore, the pre-deflection optical systems 110Y and 110M adjust the sectional beam shapes of the laser beams B1 and B2 emitted from the light sources L1 and L2 to predetermined shapes and guide them to the reflecting surface 91a of the polygon mirror 91. The optical axes (light advancing directions) of the pre-deflection optical systems 110Y and 110M and the rotation axis of the polygon mirror 91 are orthogonal to each other.

A post-deflection optical system 120 shown in FIG. 4 and FIG. 5 is arranged between the polygon mirror 91 and the image planes, i.e., the outer circumferential surfaces of the photoconductive drums 21 and 22. The post-deflection optical system 120 includes two sets of fθ lenses 121 (first imaging optical element) and 122 (second imaging optical element and third imaging optical element) which are imaging lenses for optimizing the shapes and positions on the image planes of the laser beams B1 and B2 deflected (scanned) by the polygon mirror 91. In this example, the fθ lens 121 is positioned in the vicinity of the polygon mirror 91, and the fθ lens 122 is positioned in the vicinity of a third cover glass 133 described later. As will be described later, both the fθ lenses 121 and 122 have a positive power for converging the laser beam which is the light beam. In order to adjust the horizontal synchronization of the laser beams B1 and B2 passing through the fθ lenses 121 and 122, the post-deflection optical system 120 includes a photodetector 123 for horizontal synchronization for detecting a part of the laser beam B1 at an end (scanning position AA) on the scanning start side of the laser beam B1.

In FIG. 5, the laser beam B1 is shown by being developed in a plane, and a reflection mirror 124 for reflecting the laser beam B1 towards the photodetector 123 is provided on the optical path from the fθ lens 122 to the photodetector 123. Furthermore, between the reflection mirror 124 and the photodetector 123, an optical path correction element 125 for guiding the laser beam B1 reflected towards the photodetector 123 by the reflection mirror 124 onto a detection surface of the photodetector 123 is arranged.

As shown in FIG. 4, the post-deflection optical system 120 includes three reflection mirrors 126Y (M), 127Y (M) and 128Y(M) for reflecting the laser beam B1 (B2) corresponding to each color component emitted from the fθ lens 121, and guides the laser beams B1 and B2 towards the corresponding photoconductive drums 21 and 22. However, in FIG. 5, since the laser beams B1 and B2 are shown in an overlapped form, description of the reflection mirrors 126Y (M), 127Y (M), and 128Y (M) is omitted.

The first cover glass 131 is arranged between the pre-deflection optical system 110 and the polygon mirror 91, and a second cover glass 132 is arranged between the polygon mirror 91 and the post-deflection optical system 120. When the polygon mirror 91 is boxed, the first cover glass 131 functions as an entrance of the laser beam and the second cover glass 132 functions as an exit of the laser beam as a countermeasure against wind noise generated when the polygon mirror 91 rotates. Furthermore, a third cover glass 133 is arranged between the reflection mirrors 128a, 128b, 129 and the photoconductive drums 21 and 23, and functions as an exit of the laser beam from a housing of the scanning optical system.

On the other hand, the scanning optical system 102 on the right side in FIG. 5 has the light sources L3 and L4 (third and fourth light sources) for emitting the laser beams B3 and B4 (third and fourth light beams) respectively towards the two photoconductive drums 23 and 24. The light sources L3 and L4, which are, for example, laser diodes, emit the laser beam B3 corresponding to an image signal for cyan after the color separation process and the laser beam B4 corresponding to an image signal for black after the color separation process, respectively.

The polygon mirror 91 rotates while reflecting the laser beams B3 and B4 emitted by the light sources L3 and L4 with the same reflecting surface 91a (second reflecting surface, which is different from the reflecting surface described above for reflecting the laser beams B1 and B2), thereby deflecting (scanning) the laser beams B3 and B4 towards image planes arranged at predetermined positions, i.e., outer circumferential surfaces of the corresponding photoconductive drums 23 and 24 at a predetermined linear velocity. The photoconductive drums 23 and 24 rotate in the sub-scanning direction, and in this way, the electrostatic latent images corresponding to the image signals of the respective colors are formed on the outer circumferential surfaces of the photoconductive drums 23 and 24.

The two light sources L3 and L4 of the scanning optical system 102 are also arranged at different angular positions along the rotation direction CCW of the polygon mirror 91, similarly to the light sources L1 and L2 of the scanning optical system 101. In other words, the light source L3 (cyan) among the two light sources is arranged on the upstream side along the rotation direction CCW of the polygon mirror 91. The light source L4 (black) is arranged on the downstream side along the rotation direction CCW. The two light sources L3 and L4 are also slightly shifted in a direction parallel to the rotation axis of the polygon mirror 91.

The pre-deflection optical systems 110 are arranged between the light sources L3 and L4 and the polygon mirror 91, respectively. The post-deflection optical system 120 is arranged between the polygon mirror 91 and the image planes, i.e., the outer circumferential surfaces of the photoconductive drums 23 and 24. The pre-deflection optical system 110 and the post-deflection optical system 120 of the scanning optical system 102 have the same structures as the pre-deflection optical system 110 and the post-deflection optical system 120 of the scanning optical system 101, and are symmetrical. Therefore, the description of the pre-deflection optical system 110 and the post-deflection optical system 120 of the scanning optical system 102 on the right side is omitted.

Here, a direction (a direction parallel to rotation axes of the photoconductive drums 21, 22, 23 and 24) in which the laser beams B1, B2, B3 and B4 are deflected (scanned) by the polygon mirror 91 is defined as the "main scanning direction", and a direction parallel to the rotation axis of the polygon mirror 91 which is a deflector is defined as the "sub-scanning direction". Therefore, the main scanning direction is perpendicular to directions parallel to optical axes of respective optical systems and the direction parallel to the rotation axis of the polygon mirror 91, respectively.

In some embodiments, since the scanning optical system 101 and the scanning optical system 102 are arranged on the left and right sides across the polygon mirror 91, if the polygon mirror 91 is rotated in a fixed direction, the scanning direction of the photoconductive drums 21 and 22 of the scanning optical system 101 and the scanning direction of the photoconductive drums 23 and 24 of the scanning optical system 102 are opposite. Specifically, in FIG. 5, in a case in which a side on which the light sources L1, L2, L3, and L4 are recorded with the polygon mirror 91 as the center is assumed as a plus side, and the opposite side thereof is assumed as a minus side, the scanning optical system 101 scans the image planes from the plus side to the minus side, which is indicated by an arrow S, and the scanning optical system 102 scans the image planes from the minus side to the plus side, which is indicated by an arrow T.

In order to align a writing timing of the main scanning direction of the laser beams B1, B2, B3, and B4 in the scanning optical system 101 and the scanning optical system 102, the photodetectors 123 for horizontal synchronization are provided on the upstream side in the main scanning directions of the scanning optical systems 101 and 102. Therefore, in the present embodiment, as shown in FIG. 5, the photodetector 123 (first light detection section) for horizontal synchronization is arranged at the scanning position AA on the upstream side in the main scanning direction on the plus side of an image area in the scanning optical system 101, and the photodetector 123 (second light detection section) for horizontal synchronization is arranged at a scanning position AB on the upstream side in the main scanning direction on the minus side of an image area in the scanning optical system 102.

Figure 7:
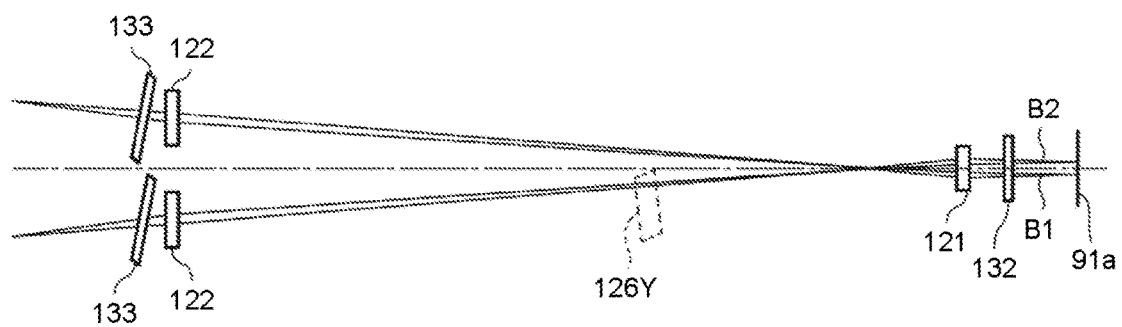
FIG. 7 is a cross-sectional view taken along a line X-X shown in FIG. 5.
Figure 8:
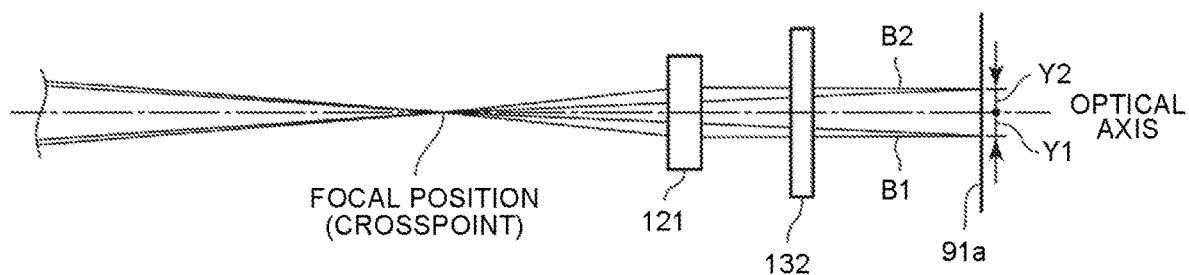
FIG. 8 is an enlarged view of the vicinity of a polygon mirror and an fθ lens shown in FIG. 7.

With reference to FIG. 5, FIG. 7, and FIG. 8, the laser beams in the scanning optical system 101 from the polygon mirror 91 to the photoconductive drum are described. FIG. 7 shows a cross section taken along a line X-X shown in FIG. 5, and shows light rays at the center of the image area. The reflection mirror 126Y at a separate position is indicated by a broken line. FIG. 8 shows the vicinity of the polygon mirror and fθ lens 121 shown in FIG. 7 in an enlarged manner. In the following description, the laser beams B1 and B2 emitted from the light sources L1 and L2 are described as an example, and the equivalent effect can be achieved for the laser beams B3 and B4 emitted from the light sources L3 and L4.

As shown in FIG. 5 described above, since the light sources L1 and L2 are separated from each other by an opening angle θ in a direction orthogonal to the rotation axis of the polygon mirror 91, the pre-deflection optical systems 110Y and 110M are not overlapped with each other in the direction parallel to the rotation axis of the polygon mirror 91.

As shown in FIG. 5, the laser beams B1 and B2 emitted from the two light sources L1 and L2 are adjusted to predetermined shapes by the pre-deflection optical systems 110Y and 110M, and then are guided to the reflecting surface 91a of the polygon mirror 91, respectively. At this time, the two light sources L1 and L2 are separated from each other in the direction parallel to the rotation axis of the polygon mirror 91. The optical axes (light advancing directions) of the pre-deflection optical systems 110Y and 110M and the rotation axis 91b of the polygon mirror 91 are orthogonal to each other. As shown in FIG. 5, the fθ lens 121 is slightly displaced by a distance Z in a direction parallel to the rotation axis 91b of the polygon mirror 91 from the light sources L1 and L2. The distance Z is determined by the positional relationship between the light sources L1 and L2 and the polygon mirror 91 and the positional relationship with the photoconductive drums 23 and 24 in a deflection direction in which the laser beams B1 and B2 reflected by the reflecting surface 91a advance.

With such an arrangement of the light sources L1 and L2, the laser beams B1 and B2 are reflected at different positions on the reflecting surface 91a. Specifically, as shown in FIG. 7, in the direction of the rotation axis 91b of the polygon mirror 91, a distance (object height) between the optical axis of the fθ lens 121 and the laser beam B1 is set to Y1, and a distance (object height) between the optical axis of the fθ lens 121 and the laser beam B2 is set to Y2.

The laser beams B1 and B2 reflected by the reflecting surface 91a of the polygon mirror 91 are given a predetermined convergence property by the cylinder lenses 113Y and 113M, and therefore, after reflection, widths of the light beams are expanded to become diverging beams. However, the principal rays of the laser beams B1 and B2 are kept parallel to each other (orthogonal to the rotation axis of the polygon mirror).

If the laser beams B1 and B2 are guided to the reflection mirrors 126Y and 126M at the separated position while maintaining the parallel state, since both are diverging beams, a sufficient separation distance cannot be obtained. Therefore, by giving optical characteristics for converging in the sub-scanning direction with the fθ lens 121, the separation distance can be ensured. First, positive optical power is given to the laser beams B1 and B2 to converge the laser beams B1 and B2 in the sub-scanning directions of the incident surface and an exit surface of the fθ lens 121 over the whole main scanning direction. In other words, the laser beam B1 bends upwards in FIG. 7 by passing through the fθ lens 121, and the laser beam B2 bends downwards in FIG. 7 by passing through the fθ lens 121. By the bending, the laser beam B1 and the laser beam B2 cross with each other at a focal position. The focal position due to the convergence property is set so as to exist between the fθ lens 121 and the fθ lens 122.

In this configuration, as shown in FIG. 8, the principal rays of the laser beams B1 and B2 are incident on the fθ lens 121 in parallel with the optical axis by the distance Y1 and the distance Y2, respectively. If the distance Y1 and the distance Y2 are substantially equal to each other, the laser beam B1 and the laser beam B2 cross at the focal position. After crossing, the laser beams B1 and B2 advance in a direction away from the sub-scanning direction, and are separated at substantially equal intervals across the optical axis at the separated position, and the sufficient separation distance can be obtained in the distance to the reflection mirror 126Y (M).

Next, the laser beams B1 and B2 emitted from the fθ lens 121 are diverged in the sub-scanning direction before the light rays are incident on the fθ lens 122. As a method of converting the laser beams B1 and B2 to diverging beams, there is (1) a method of converting them to diverging beams after emission from the fθ lens 121, or (2) a method of converting them to diverging beams when the laser beams B1 and B2 are converged in the sub-scanning direction once between the fθ lens 121 and the fθ lens 122 and then incident on the incident surface of the fθ lens 122 after passing through the focal position.

This is because when the light beam is incident on the fθ lens 122 in the sub-scanning direction while the laser beam has the convergence property, it is impossible to obtain sufficient image side NA (Numerical Aperture) in the sub-scanning direction, and the beam diameter is difficult to narrow down. On the other hand, as described above, before the laser beams B1 and B2 are incident on the fθ lens 122, the laser beams B1 and B2 become diverging beams diverging in the sub-scanning direction. By converting them to diverging beams, it is possible to give the power for converging the laser beams B1 and B2 in the sub-scanning direction to the laser beams B1 and B2 on the image plane of the fθ lens 122. By giving the power for converging, sufficient image side NA in the sub-scanning direction can be obtained, and the beam diameter can be narrowed down to a desired value.

As described above, in the optical scanning device of the present embodiment, the fθ lens 121 of the post-deflection optical system 120 gives the optical characteristics of converging in the sub-scanning direction to the laser beams. Therefore, a positive optical power in the sub-scanning direction is given to the laser beams B1 and B2 passing through the fθ lens 121 over the whole main scanning direction, and thus, the focal position is generated by converging. At the same time, since the laser beams pass through different portions of the fθ lens 121, bending angles are different, and the laser beam B1 and the laser beam B2 advance so as to cross with each other. Since the laser beams B1 and B2 cross with each other and then advance in a direction in which they are separated from each other in the sub-scanning direction, a sufficient separation distance can be obtained between the laser beam B1 and the laser beam B2. After securing the sufficient separation distance, reflection mirror groups of the scanning optical system 101 and the scanning optical system 102 can be appropriately arranged, and the laser beams can be guided towards the photoconductive drums 21 and 22.

Before incident on the fθ lens 122 arranged in front of the photoconductive drums 21 and 22 on the optical path, the laser beams B1 and B2 become the diverging beams diverging in the sub-scanning direction. By giving a power for converging the diverging beams in the sub-scanning direction with the image plane of the fθ lens 122, the image side NA can be obtained, and the beam diameter can be narrowed down to a desired value.

Therefore, it is possible to provide the optical scanning device for colors which is barely influenced by the unevenness of the surface of the polygon mirror without increasing the thickness of the polygon mirror. In addition, it is possible to provide the image forming apparatus provided with such an optical scanning device for colors.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An optical scanning device, comprising:
    a first light source;
    a second light source;
    a deflector configured to deflect a first light beam and a second light beam respectively emitted from the first light source and the second light source;
    a first lens configured to pass the first light beam and the second light beam deflected by the deflector; and
    a second lens configured to pass the first light beam and a third lens configured to pass the second light beam deflected by the deflector and passed through the first lens, the first light source and the second light source arranged at different angular positions along a rotation direction of the deflector, and facing a surface of the deflector,
    wherein
        the first light beam and the second light beam emitted from the first light source and the second light source have an opening angle between principal rays of the first light beam and the second light beam in a main scanning direction, and are incident on a same surface of the deflector at different positions deviating from each other in a deflecting axis direction while orthogonal to a deflecting axis of the deflector,
        the deflector is configured such that the principal rays of the deflected first light beam and the deflected second light beam are incident on the first lens while separated from an optical axis of the first lens at a predetermined distance, and
        the first lens gives positive optical power in a sub-scanning direction to the incident first light beam and second light beam over an entire main scanning direction, and a focal position respectively exists between the first lens and the second lens and between the first lens and the third lens.

2. The optical scanning device according to claim 1, wherein the first lens, the second lens, and the third lens form a first optical system, and further comprising a second optical system including corresponding optical elements for the first lens, the second lens, and the third lens.

3. The optical scanning device according to claim 2, wherein the first optical system and the second optical system are arranged symmetrical about the deflector.

4. The optical scanning device according to claim 1, further comprising four or more photoconductive drums each having an axis of rotation, wherein the axes of rotation of the four or more photoconductive drums fall in a plane orthogonal to the rotation axis of the deflector.

5. The optical scanning device according to claim 1, wherein the first light source and the second light source are shifted relative to each other in a direction parallel to the rotation axis of the deflector.

6. The optical scanning device according to claim 1, wherein the deflector includes a polygon mirror having a plurality of reflecting surfaces.

7. The optical scanning device according to claim 1, wherein each of the first light source and the second light source includes a laser diode.

8. The optical scanning device according to claim 1, wherein the third lens is the same lens as the second lens.

9. The optical scanning device according to claim 1, wherein the first lens gives a divergence property in the sub-scanning direction to the first light beam and the second light beam after the first light beam and the second light beam pass through the focal position, and then the first light beam and the second light beam are respectively incident on the second lens and the third lens.

10. The optical scanning device according to claim 1, wherein
    the second lens and the third lens have a same shape, and give positive power for respectively converging the first light beam and the second light beam passing through the second lens and the third lens, and then the first light beam and the second light beam are respectively directed to a first surface to be scanned and a second surface to be scanned.

11. An optical scanning device, comprising:
a first light source and a second light source;
a deflector configured to deflect a first light beam and a second light beam respectively emitted from the first light source and the second light source;
a first imaging optical element configured to give predetermined properties to the first light beam and the second light beam deflected by the deflector;
a second imaging optical element configured to guide the first light beam emitted from the first imaging optical element onto a first surface to be scanned; and
a third imaging optical element configured to guide the second light beam emitted from the first imaging optical element onto a second surface to be scanned, wherein:
the first light beam and the second light beam emitted from the first light source and the second light source have an opening angle between principal rays of the first light beam and the second light beam in a main scanning direction, and are incident on a same surface of the deflector at different positions deviating from each other in a deflecting axis direction while orthogonal to a deflecting axis of the deflector,
the deflector is configured such that the principal rays of the deflected first light beam and the deflected second light beam are incident on the first imaging optical element while separated from an optical axis of the first imaging optical element at a predetermined distance,
the first light source and the second light source are shifted relative to each other in a direction parallel to a rotation axis of the deflector, and
the first imaging optical element gives positive optical power in a sub-scanning direction to the incident first light beam and second light beam over a main scanning direction, and a focal position respectively exists between the first imaging optical element and the second imaging optical element and between the first imaging optical element and the third imaging optical element.

12. An image forming apparatus, comprising:
an optical scanning device; and
an image recording section configured to form an image on an image receiving medium using light beams emitted from the optical scanning device, wherein
the optical scanning device comprises:
a first light source and a second light source;
a deflector configured to deflect a first light beam and a second light beam respectively emitted from the first light source and the second light source, wherein the first light source and the second light source are shifted relative to each other in a direction parallel to a rotation axis of the deflector;
a first imaging optical element configured to give predetermined properties to the first light beam and the second light beam deflected by the deflector;
a second imaging optical element configured to guide the first light beam emitted from the first imaging optical element onto a first surface to be scanned; and
a third imaging optical element configured to guide the second light beam emitted from the first imaging optical element onto a second surface to be scanned, wherein:
the first light beam and the second light beam emitted from the first light source and the second light source have an opening angle between principal rays of the first light beam and the second light beam in a main scanning direction, and are incident on a same surface of the deflector at different positions deviating from each other in a deflecting axis direction while orthogonal to a deflecting axis of the deflector,
the deflector is configured such that the principal rays of the deflected first light beam and the deflected second light beam are incident on the first imaging optical element while separated from an optical axis of the first imaging optical element at a predetermined distance, and
the first imaging optical element gives positive power to optical power in a sub-scanning direction to the incident first light beam and second light beam over an entire main scanning direction, and a focal position respectively exists between the first imaging optical element and the second imaging optical element and between the first imaging optical element and the third imaging optical element.

13. The image forming apparatus according to claim 12, wherein the image recording section includes photoconductive drums receiving the light beams emitted from the optical scanning device.

14. The image forming apparatus according to claim 13, further comprising:
a first optical system configured to process a cross-sectional shape of the first light beam emitted from the first light source and give a divergence property to the first light beam on each optical path between the deflector and the first light source, and to process a cross-sectional shape of the second light beam emitted from the second light source and give a divergence property to the second light beam on each optical path between the deflector and the second light source; and
a second optical system comprising a third light beam emitted from a third light source and a fourth light beam emitted from a fourth light source, the second optical system configured to process a cross-sectional shape of the third light beam emitted from the third light source and give a divergence property to the third light beam on each optical path between the deflector and the third light source, and to process a cross-sectional shape of the fourth light beam emitted from the fourth light source and give a divergence property to the fourth light beam on each optical path between the deflector and the fourth light source
wherein the first optical system and the second optical system are symmetric about the rotation axis of the deflector.

15. The image forming apparatus according to claim 14, wherein the photoconductive drums include respective centers of rotation aligned in a plane orthogonal to the rotation axis of the deflector.

* * * * *